US012735942B2

(12) United States Patent
Chen

(10) Patent No.: US 12,735,942 B2
(45) Date of Patent: Sep. 15, 2026

(54) DUAL-SPRING DUAL-ROPE ROLLER BLIND CONTROLLER

(71) Applicant: COTTAI LTD., Tainan City (TW)

(72) Inventor: Kuan-Ting Chen, Tainan City (TW)

(73) Assignee: COTTAI LTD., Tainan City (TW)

( * ) Notice: Subject to any disclaimer, the term of this patent is extended or adjusted under 35 U.S.C. 154(b) by 104 days.

(21) Appl. No.: 19/020,176

(22) Filed: Jan. 14, 2025

(65) Prior Publication Data

US 2026/0201747 A1 Jul. 16, 2026

(51) Int. Cl.
*E06B 9/78* (2006.01)

(52) U.S. Cl.
CPC .......... *E06B 9/78* (2013.01); *E06B 2009/785* (2013.01)

(58) Field of Classification Search
CPC ........................... E06B 9/326; E06B 2009/785
See application file for complete search history.

(56) References Cited

U.S. PATENT DOCUMENTS

| | | | | |
|---|---|---|---|---|
| 1,788,021 A * | 1/1931 | Hadden | E06B 9/90 | 160/307 |
| 1,797,204 A * | 3/1931 | Hadden | E06B 9/90 | 160/307 |
| 6,435,252 B2 * | 8/2002 | Colson | E06B 9/32 | 160/173 R |
| 7,387,150 B2 | 6/2008 | Liu | | |
| 8,365,362 B2 * | 2/2013 | Chou | F16G 11/02 | 24/136 L |
| 9,657,517 B2 * | 5/2017 | Huang | E06B 9/32 | |
| 9,790,737 B2 | 10/2017 | Seib | | |
| 10,017,984 B2 * | 7/2018 | Marzilli | E06B 9/50 | |
| 11,505,993 B2 * | 11/2022 | de Vries | E06B 9/78 | |
| 11,866,994 B2 * | 1/2024 | Francoeur | E06B 9/78 | |
| 11,927,058 B2 * | 3/2024 | Lee | E06B 9/34 | |
| 12,320,196 B2 * | 6/2025 | Wang | E06B 9/78 | |

(Continued)

FOREIGN PATENT DOCUMENTS

| | | | |
|---|---|---|---|
| EP | 2546451 A1 * | 1/2013 | E06B 9/262 |
| KR | 20190124998 A * | 11/2019 | E06B 9/42 |

(Continued)

*Primary Examiner* — Catherine A Kelly
(74) *Attorney, Agent, or Firm* — BACON & THOMAS, PLLC

(57) ABSTRACT

A dual-spring dual-rope roller blind controller is mounted at a roller blind and comprises a housing, a roll-and-collect module and a driving shaft, both mounted inside the housing. The roll-and-collect module comprises a first and a second roll-and-collect assembly arranged oppositely and structurally identical. Each roll-and-collect assembly comprises a collecting disc with a rope, a resilient roll-and-collect element and a resilient abutting element, both connected between the housing and the collecting disc and both driving the collecting disc to rotate backwardly. A ratchet toothed portion inside the collecting disc is engaged with a wheel ratchet portion of a driving wheel of the driving shaft when the rope is pulled. Through the roll-and-collect module's structure and the roll-and-collect module engaged with the driving wheel intermittently and repeatedly, the dual-spring dual-rope roller blind controller shortens the ropes' length to avoid risk of injury or choking, simplifies structures and lowers costs.

20 Claims, 10 Drawing Sheets

(56) References Cited

U.S. PATENT DOCUMENTS

| | | | | |
|---|---|---|---|---|
| 2011/0126380 | A1* | 6/2011 | Cheng | E06B 9/326<br>24/132 R |
| 2015/0376941 | A1* | 12/2015 | Fujita | E06B 9/58<br>160/241 |
| 2025/0059826 | A1* | 2/2025 | Chen | E06B 9/322 |
| 2025/0263979 | A1* | 8/2025 | Chen | E06B 9/42 |

FOREIGN PATENT DOCUMENTS

| | | | | |
|---|---|---|---|---|
| KR | 102452508 | B1 * | 10/2022 | E06B 9/80 |
| WO | WO-2015022949 | A1 * | 2/2015 | E06B 9/326 |

* cited by examiner

DUAL-SPRING DUAL-ROPE ROLLER BLIND CONTROLLER

BACKGROUND OF THE INVENTION

1. Field of the Invention

The present invention is a dual-spring dual-rope roller blind controller, especially a dual-spring dual-rope roller blind controller used to control a roller blind to roll up and to expand.

2. Description of Related Art

A conventional roller blind mainly rolls up a blind curtain through a shaft rod and has an annular bead chain mounted around the shaft rod. A user can pull the bead chain toward different directions to drive the shaft rod to roll up or release the blind curtain. However, for convenience of using the roller blind, the annular bead chain often has a certain length, which allows kids or pets to easily touch the bead chain while playing, leading to risk that they might harm or even choke themselves with the bead chain.

Therefore, United States Patent Publication NO. 11505993 provides a controller for operating a roller blind. The controller comprises two collecting discs. Each of the collecting disc has a rope, and the two ropes of the two collecting discs are rolled up oppositely. The two collecting discs are connected through a resilient resetting structure. Two different operators respectively correspond to and cooperate with two one-directional couplings, which have opposite rotating directions, respectively connected to the two collecting discs. A bushing connected to the shaft rod of the roller blind forms two engaging portions respectively corresponding to the two one-directional couplings' rotating directions. When pulling the rope of one of the two collecting discs, said collecting disc is rotated, driving corresponding operator and one-directional coupling to rotate, so the one-directional coupling extends a clutch arm to engage corresponding engaging portion of the bushing and thus drives the bushing to rotate. When releasing the rope, the collecting disc with the rope will be driven by the resilient resetting structure to rotate backwardly to roll up the rope. At the same time, the operator drives the one-directional coupling to rotate backwardly, so the clutch arm of the one-directional coupling is retrieved and detached from the bushing. Therefore, the user can control the roller blind to roll up or expand by pulling the ropes at different sides. In addition, the ropes of the two collecting discs are not annular, so can avoid kids or pets pulling the ropes and leading to risk of harming or choking themselves.

However, the controller for operating a roller blind has complicated structures inside and numerous components, therefore is inconvenient in assembling and expensive for molding to manufacture and should be improved.

SUMMARY OF THE INVENTION

The present invention provides a dual-spring dual-rope roller blind controller to resolve drawbacks that a conventional controller for operating a roller blind has complicated structures inside and numerous components, and so is inconvenient in assembling and expensive for manufacturing.

The dual-spring dual-rope roller blind controller is configured to be mounted at a roller blind and is connected to a rotating shaft of the roller blind. The dual-spring dual-rope roller blind controller comprises a housing, a roll-and-collect module and a driving shaft. The housing has an assembling chamber, a shaft hole and two through holes. The assembling chamber is disposed inside the housing. The shaft hole is disposed at a center of the housing and spatially communicates with the assembling chamber. The two through holes are respectively disposed at two sides of a bottom portion of the housing. The roll-and-collect module comprises two roll-and-collect assemblies, which are identical in structure and are disposed in the assembling chamber of the housing. The two roll-and-collect assemblies are respectively defined as a first roll-and-collect assembly and a second roll-and-collect assembly. Each one of the first roll-and-collect assembly and the second roll-and-collect assembly comprises a collecting disc, a rope, a resilient roll-and-collect element, and a resilient abutting element. The collecting disc is rotatably mounted inside the assembling chamber of the housing, can be moved up and down, and has a collecting recess, a clutch opening and a ratchet toothed portion. The collecting recess is disposed at a periphery of the collecting disc. The clutch opening is disposed at a center of the collecting disc. The ratchet toothed portion is disposed at an inner surface of the clutch opening and surrounds the clutch opening. The rope is rolled up and disposed in the collecting recess of the collecting disc, and extends through one of the two through holes of the housing. The resilient roll-and-collect element is connected between the collecting disc and the housing and can drive the collecting disc to rotate back to the collecting disc's original angle. The resilient abutting element is mounted at a bottom portion of the assembling chamber of the housing and abuts the collecting disc to push the collecting disc back to its original position. The two roll-and-collect assemblies are arranged opposite each other to make the two ropes of the two roll-and-collect assemblies rolled up in opposite directions. The driving shaft comprises a shaft rod and a driving wheel. The shaft rod is mounted through the shaft hole of the housing. The driving wheel is rotatably mounted around the shaft rod and passes through the two clutch openings of the two collecting discs of the two roll-and-collect assemblies. The driving wheel comprises two wheel ratchet portions, a connecting portion and a positioning disc. The two wheel ratchet portions have different rotatable directions and respectively correspond in position to the two ratchet toothed portions of the two collecting discs of the two roll-and-collect assemblies. Each one of the two wheel ratchet portions is engaged with or detached from the corresponding ratchet toothed portion. The connecting portion of the driving wheel is configured to be connected to the rotating shaft of the roller blind. The positioning disc extends radially and outwardly from between the two wheel ratchet portions and is located between the two roll-and-collect assemblies.

Therefore, the dual-spring dual-rope roller blind controller has benefits as follows:

1. Safe in use: By the roll-and-collect module of the dual-spring dual-rope roller blind controller, when pulling any one of the ropes of the first and second roll-and-collect assemblies, the corresponding collecting disc engages with the driving wheel to drive the rotating shaft of the roller blind to rotate. At the same time, the corresponding resilient abutting element and the corresponding resilient roll-and-collect element can drive the collecting disc to rotate back to its original angle and position. Therefore, a user can pull the ropes to control the roller blind to roll up or expand, and drooping lengths of the ropes are shortened, avoiding risk of injury or choking, and thereby enhancing safety in use.

2. Simplified structures and lowering costs: The dual-spring dual-rope roller blind controller has simplified structures and is easy to assemble. The first roll-and-collect assembly and the second roll-and-collect assembly are the same in structure, therefore lowering costs of molding.

DETAILED DESCRIPTION OF THE PREFERRED EMBODIMENT

Figure 1:
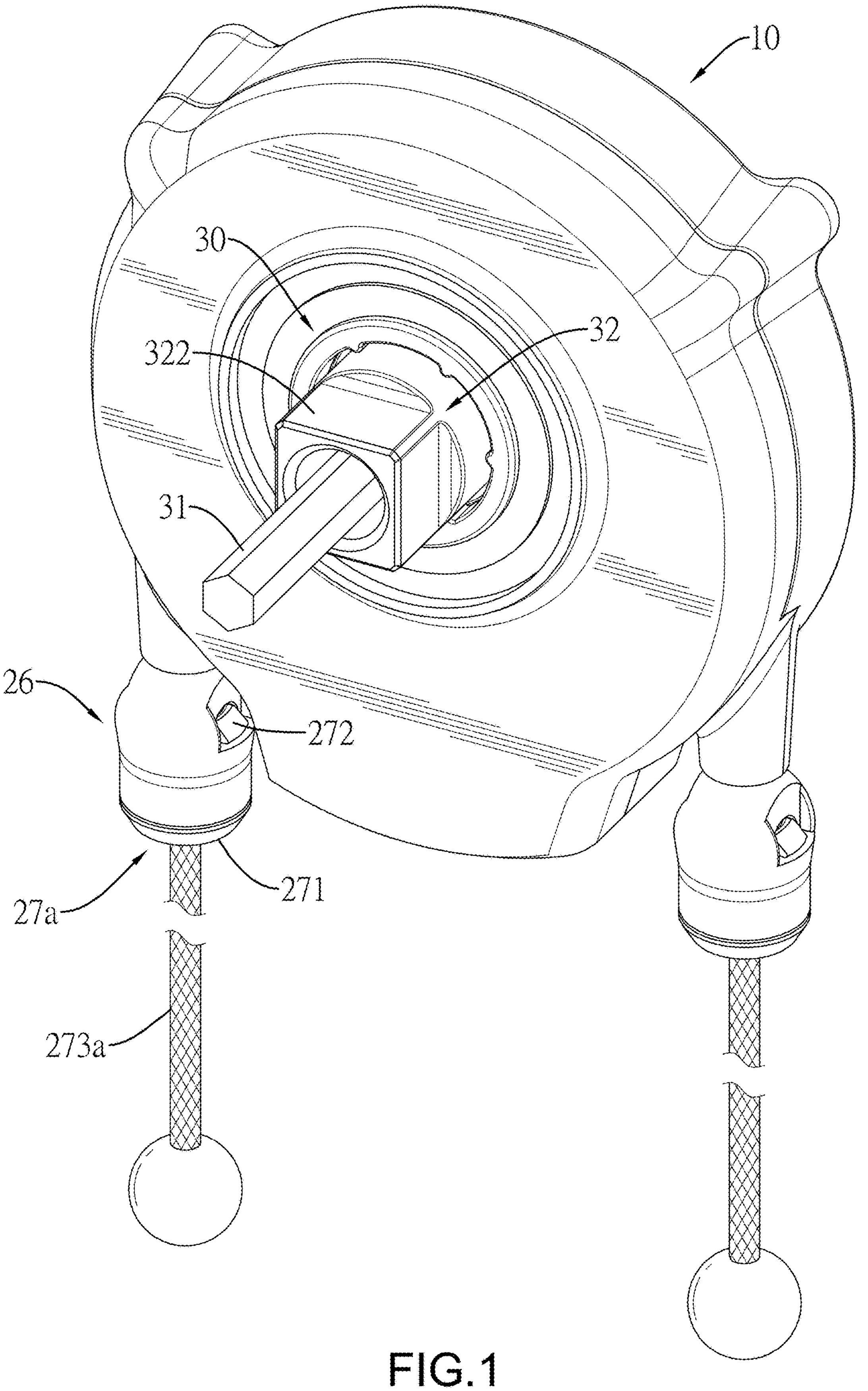
FIG. 1 is a perspective view of a dual-spring dual-rope roller blind controller in accordance with the present invention.
Figure 2:
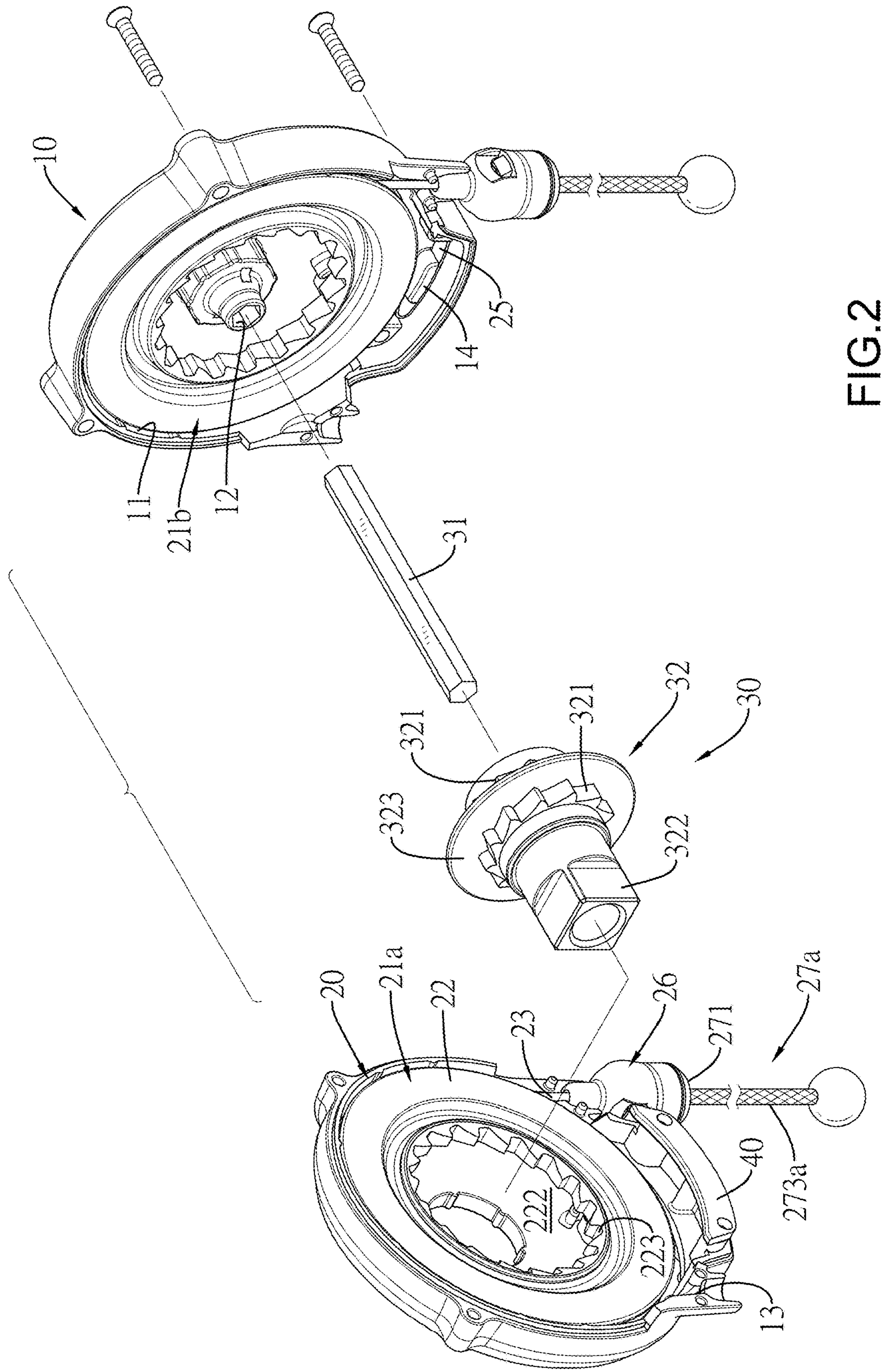
FIG. 2 is an exploded view of the dual-spring dual-rope roller blind controller.

With reference to FIGS. 1 and 2, an embodiment of a dual-spring dual-rope roller blind controller in accordance with the present invention is configured to be mounted at a roller blind and is connected to a rotating shaft of the roller blind. The dual-spring dual-rope roller blind controller comprises a housing 10, a roll-and-collect module 20, and a driving shaft 30.

Figure 3:
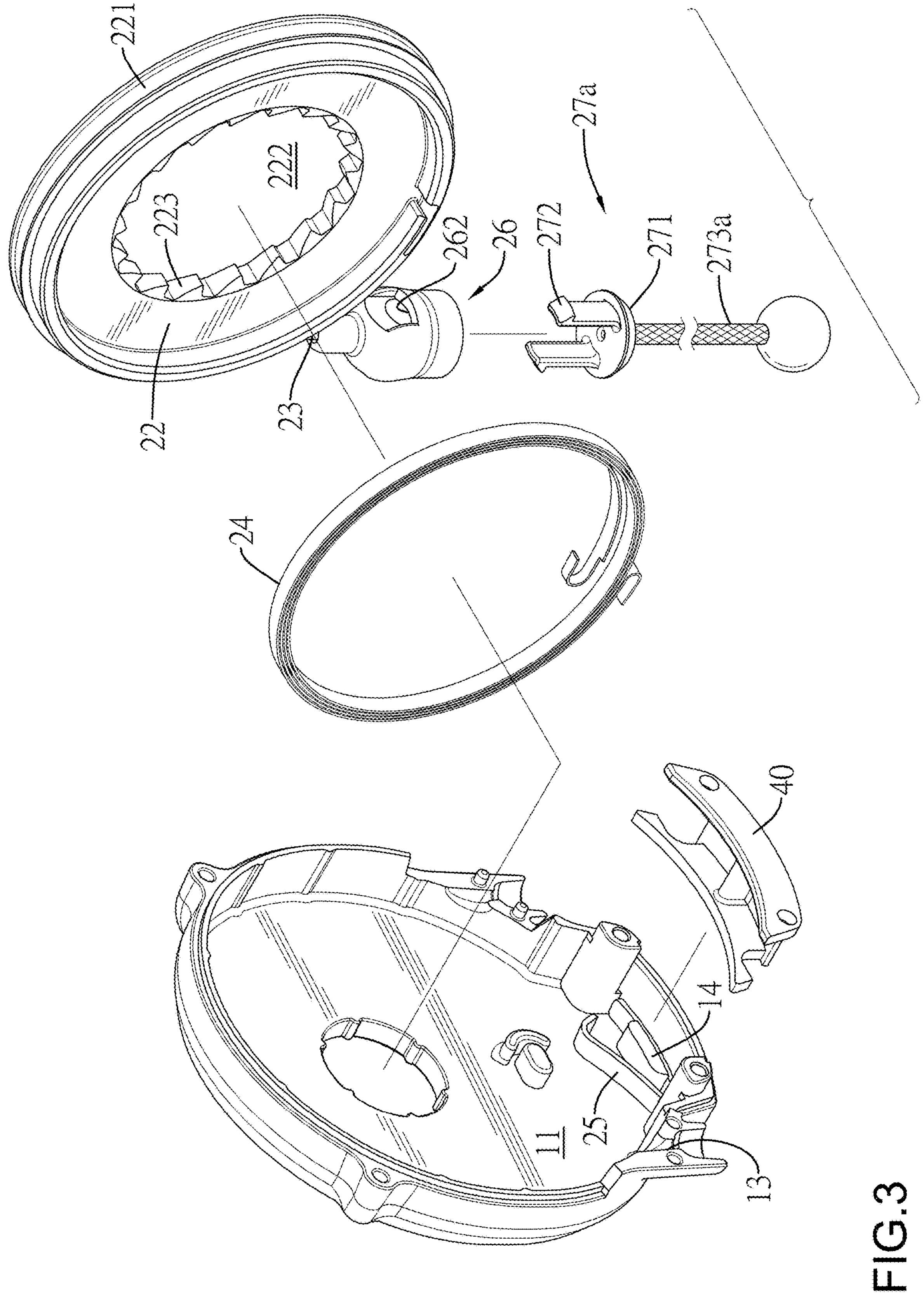
FIG. 3 is an exploded view of a first roll-and-collect assembly and a housing of the dual-spring dual-rope roller blind controller.
Figure 4:
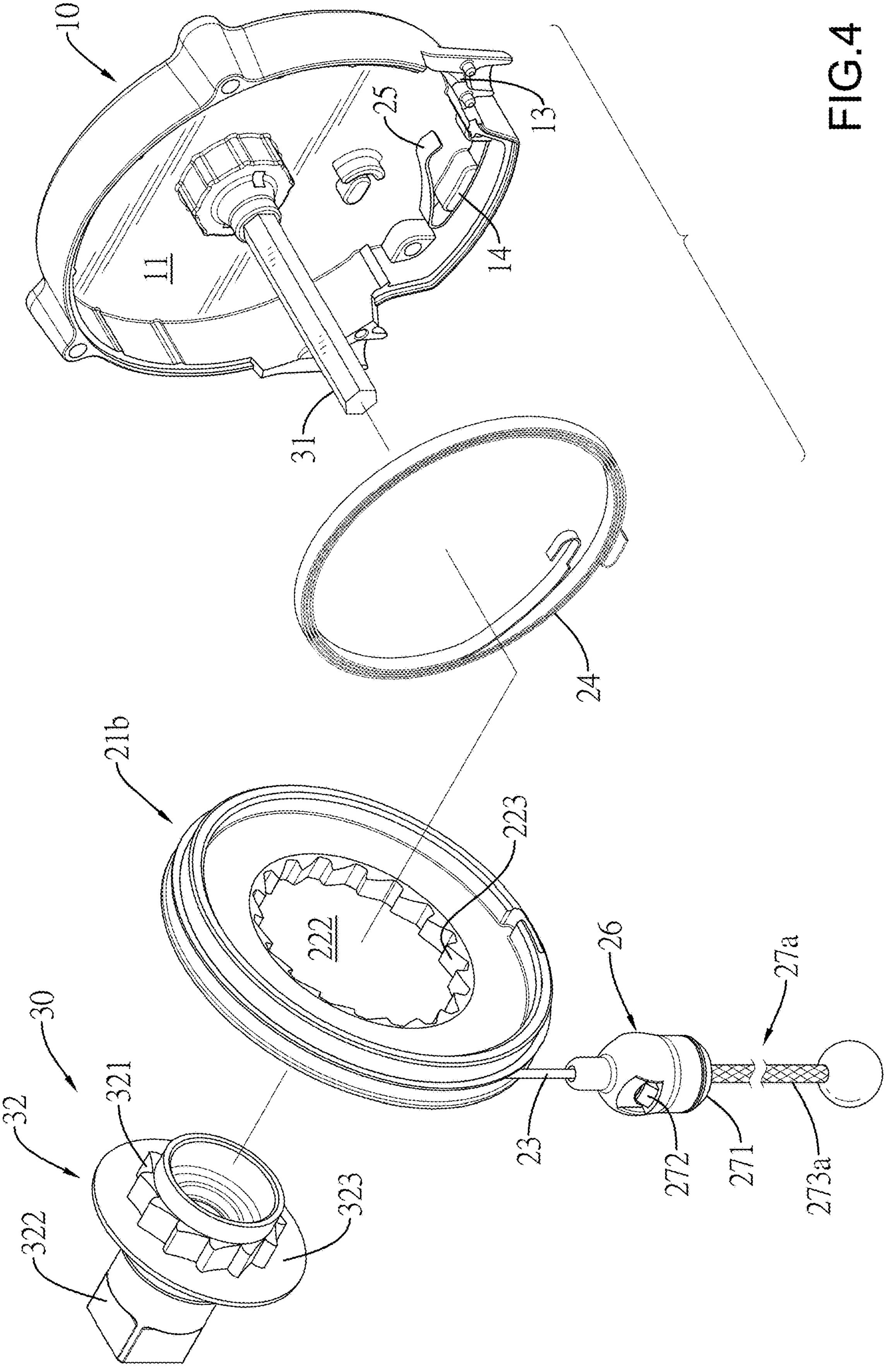
FIG. 4 is an exploded view of a second roll-and-collect assembly, a driving shaft and the housing of the dual-spring dual-rope roller blind controller.
Figure 5:
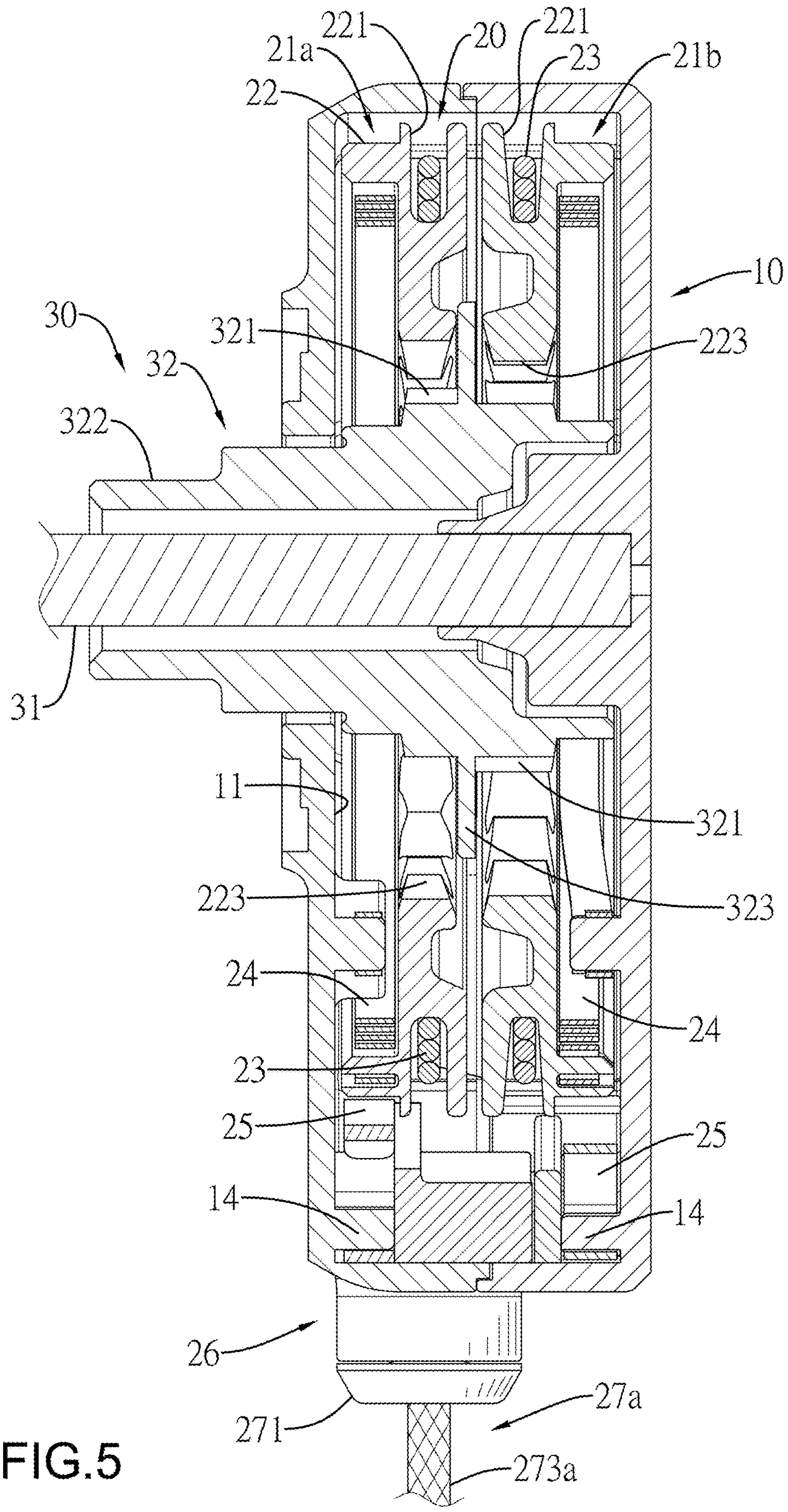
FIG. 5 is a side sectional view of the dual-spring dual-rope roller blind controller.

As shown in FIGS. 2 to 4, the housing 10 has an assembling chamber 11 disposed inside the housing 10. The housing 10 has a shaft hole 12 disposed at a center of the housing 10 and spatially communicating with the assembling chamber 11. The housing 10 has two through holes 13 respectively disposed at two sides of a bottom portion of the housing 10.

As shown in FIGS. 2 to 6, the roll-and-collect module 20 comprises two roll-and-collect assemblies 21*a*, 21*b*, which are respectively defined as a first roll-and-collect assembly 21*a* and a second roll-and-collect assembly 21*b*. The first roll-and-collect assembly 21*a* and the second roll-and-collect assembly 21*b* are identical in structure and are disposed in the assembling chamber 11 of the housing 10. Each one of the two roll-and-collect assemblies 21*a*, 21*b* comprises a collecting disc 22, a rope 23, a resilient roll-and-collect element 24, and a resilient abutting element 25. The collecting disc 22 is rotatably mounted inside the assembling chamber 11 of the housing 10, is able to be moved up and down, and has a collecting recess 221, a clutch opening 222, and a ratchet toothed portion 223. In any of the first and second roll-and-collect assemblies 21*a*, 21*b*, the collecting recess 221 is disposed at a periphery of the collecting disc 22. The clutch opening 222 is disposed at a center of the collecting disc 22. The ratchet toothed portion 223 is disposed at an inner surface of the clutch opening 222 and surrounds the clutch opening 222. The rope 23 is rolled up, is disposed in the collecting recess 221 of the collecting disc 22, and extends through one of the two through holes 13 of the housing 10. The resilient roll-and-collect element 24 is connected between the collecting disc 22 and the housing 10, and drives the collecting disc 22 to rotate back to the collecting disc 22's original angle. The resilient abutting element 25 is mounted at a bottom portion of the assembling chamber 11 of the housing 10, and can abut the collecting disc 22 to push it back to its original position. The two roll-and-collect assemblies 21*a*, 21*b* are arranged opposite each other to make the two ropes 23 of the two roll-and-collect assemblies 21*a*, 21*b* rolled up in opposite directions.

As shown in FIGS. 2 and 4 to 6, the driving shaft 30 comprises a shaft rod 31 and a driving wheel 32. The shaft rod 31 is mounted through the shaft hole 12 of the housing 10. The driving wheel 32 is rotatably mounted around the shaft rod 31 and passes through the two clutch openings 222 of the two collecting discs 22 of both of the first and second roll-and-collect assemblies 21*a*, 21*b*. The driving wheel 32 comprises two wheel ratchet portions 321, a connecting portion 322, and a positioning disc 323. The two wheel ratchet portions 321 have different rotatable directions and respectively correspond in position to the two ratchet toothed portions 223 of the two collecting discs 22 of the first and second roll-and-collect assemblies 21*a*, 21*b*. Each one of the two wheel ratchet portions 321 is respectively engaged with or detached from the corresponding ratchet toothed portion 223. The connecting portion 322 of the driving wheel 32 is configured to be connected to the rotating shaft of the roller blind. The positioning disc 323 extends radially and outwardly from between the two wheel ratchet portions 321 and is located between the first and second roll-and-collect assemblies 21*a*, 21*b*.

In addition, the positioning disc 323 of the driving wheel 32 effectively separates and limits the collecting discs 22 of the first and second roll-and-collect assemblies 21*a*, 21*b* in position.

Besides, as shown in FIGS. 2 to 4, the housing 10 has two clamping protrusions 14 protruding and disposed in the assembling chamber 11. The two clamping protrusions 14 respectively clamp and fix the two resilient abutting elements 25 of the first and second roll-and-collect assemblies 21*a*, 21*b*.

Furthermore, as shown in FIGS. 2 and 3, the dual-spring dual-rope roller blind controller comprises a limiting element 40 disposed inside the assembling chamber 11 of the housing 10 and between the two resilient abutting elements 25 of the first and second roll-and-collect assemblies 21*a*, 21*b*.

Figure 6:
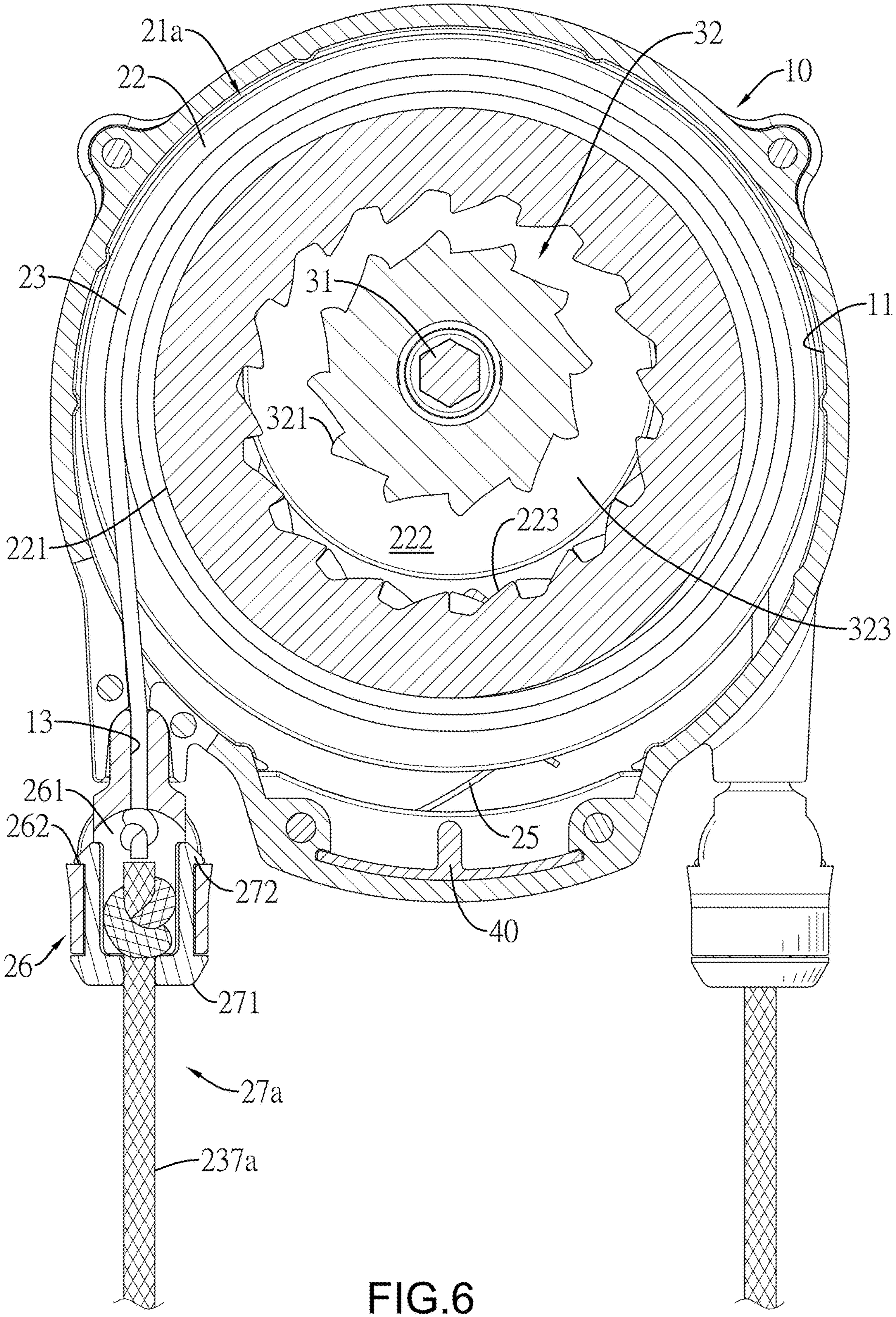
FIG. 6 is a front sectional view of the dual-spring dual-rope roller blind controller.
Figure 10:
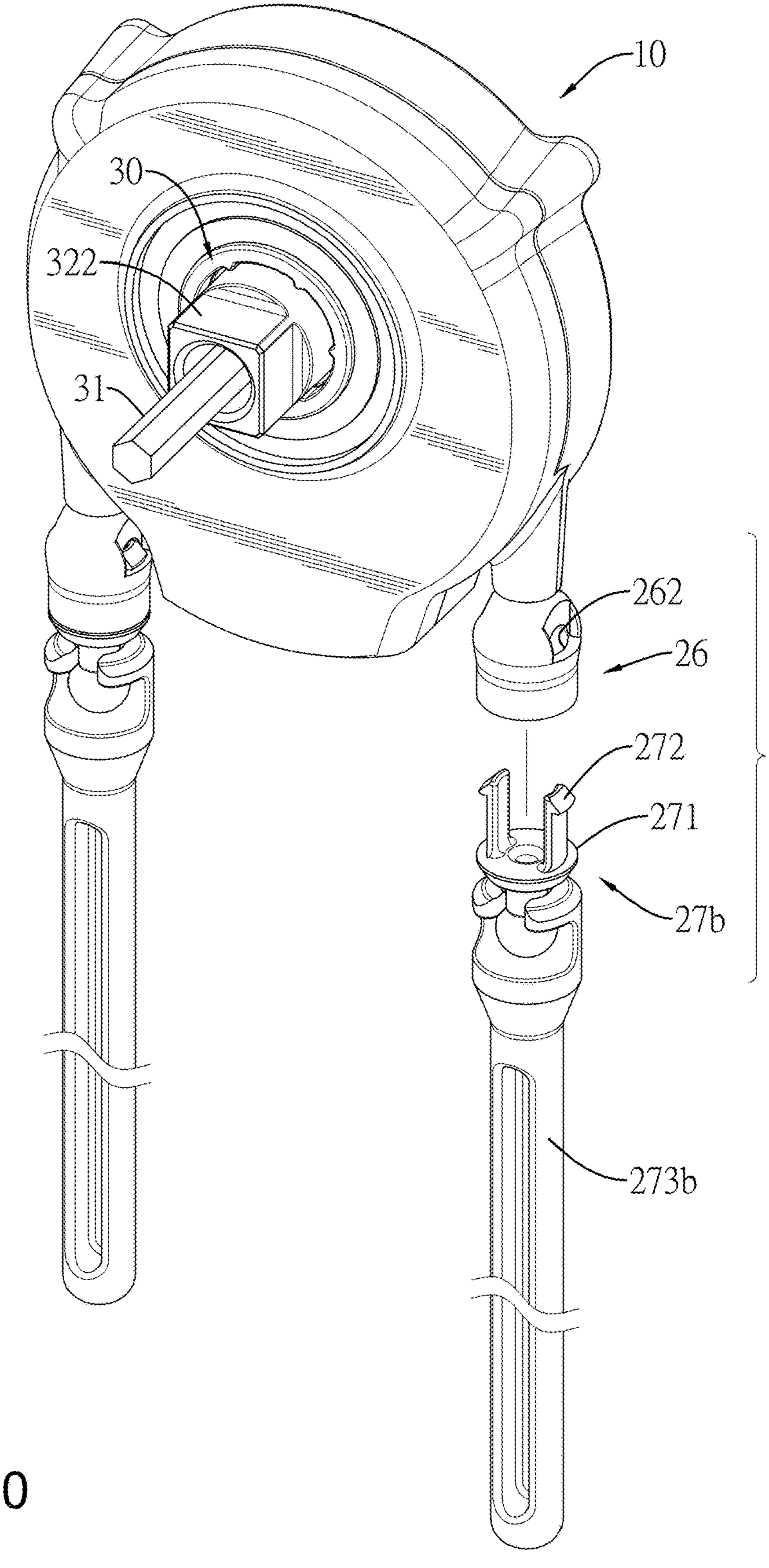
FIG. 10 is a perspective view of the dual-spring dual-rope roller blind controller with a different configuration of extending units.

Additionally, as shown in FIGS. 3, 6 and 10, each one of the first roll-and-collect assembly 21*a* and the second roll-and-collect assembly 21*b* comprises a buckling element 26 and an extending part 27*a*, 27*b*. In any one of the first and second roll-and-collect assemblies 21*a*, 21*b*, the buckling element 26 is mounted at a terminal end of the rope 23, and the extending part 27*a*, 27*b* detachably buckles the buckling element 26. Besides, the buckling element 26 comprises a buckling recess 261, having a buckling opening faced downwardly, and multiple buckling holes 262 spatially communicating with the buckling recess 261. The extending part 27*a*, 27*b* comprises a connecting buckle 271 and an extending unit 273*a*, 273*b*. The connecting buckle 271 comprises multiple buckle hooks 272 extending into the buckling recess 261 of the buckling element 26 and respectively buckled in the multiple buckling holes 262. The extending unit 273*a*, 273*b* is connected to the connecting buckle 271.

As shown in FIGS. 3, 6 and 10, in any one of the first and second roll-and-collect assemblies 21*a*, 21*b*, the extending part 27*a*, 27*b* is an extension of the rope 23 to facilitate ease in use. Additionally, the extending part 27*a*, 27*b* can be changed according to users'needs. When detaching the extending part 27*a*, 27*b*, the multiple buckle hooks 272 of the connecting buckle 271 of the extending part 27*a*, 27*b* are pressed to detach the multiple buckle hooks 272 from the multiple buckling holes 262 of the buckling element 26, and then the connecting buckle 271 can be detached. When attaching the extending part 27*a*, 27*b*, the connecting buckle 271 of the extending part 27*a*, 27*b* can be directly inserted into the buckling recess 261 of the buckling element 26, and the multiple buckle hooks 272 are buckled into the multiple buckling holes 262 of the buckling element 26, thereby completing attaching the extending part 27*a*, 27*b*.

Besides, the extending part 27*a*, 27*b* has different configurations according to needs. For example, as shown in FIG. 3, in a preferable embodiment of the dual-spring dual-rope roller blind controller, the extending unit 273*a* is a bendable rope. Alternatively, as shown in FIG. 10, in another preferable embodiment of the dual-spring dual-rope roller blind controller, the extending unit 273*b* is an elongated rod, which can further avoid kids or pets injuring or choking themselves while playing.

As shown in FIGS. 2, 7 to 9, the dual-spring dual-rope roller blind controller is connected to the rotating shaft of the roller blind through the connecting portion 322 of the driving wheel 32. When using the dual-spring dual-rope roller blind controller, by pulling the extending part 27*a*, 27*b* of the first roll-and-collect assembly 21*a*, the rotating shaft of the roller blind is rotated counterclockwise, and by pulling the extending part 27*a*, 27*b* of the second roll-and-collect assembly 21*b*, the rotating shaft of the roller blind is rotated clockwise.

Figure 7:
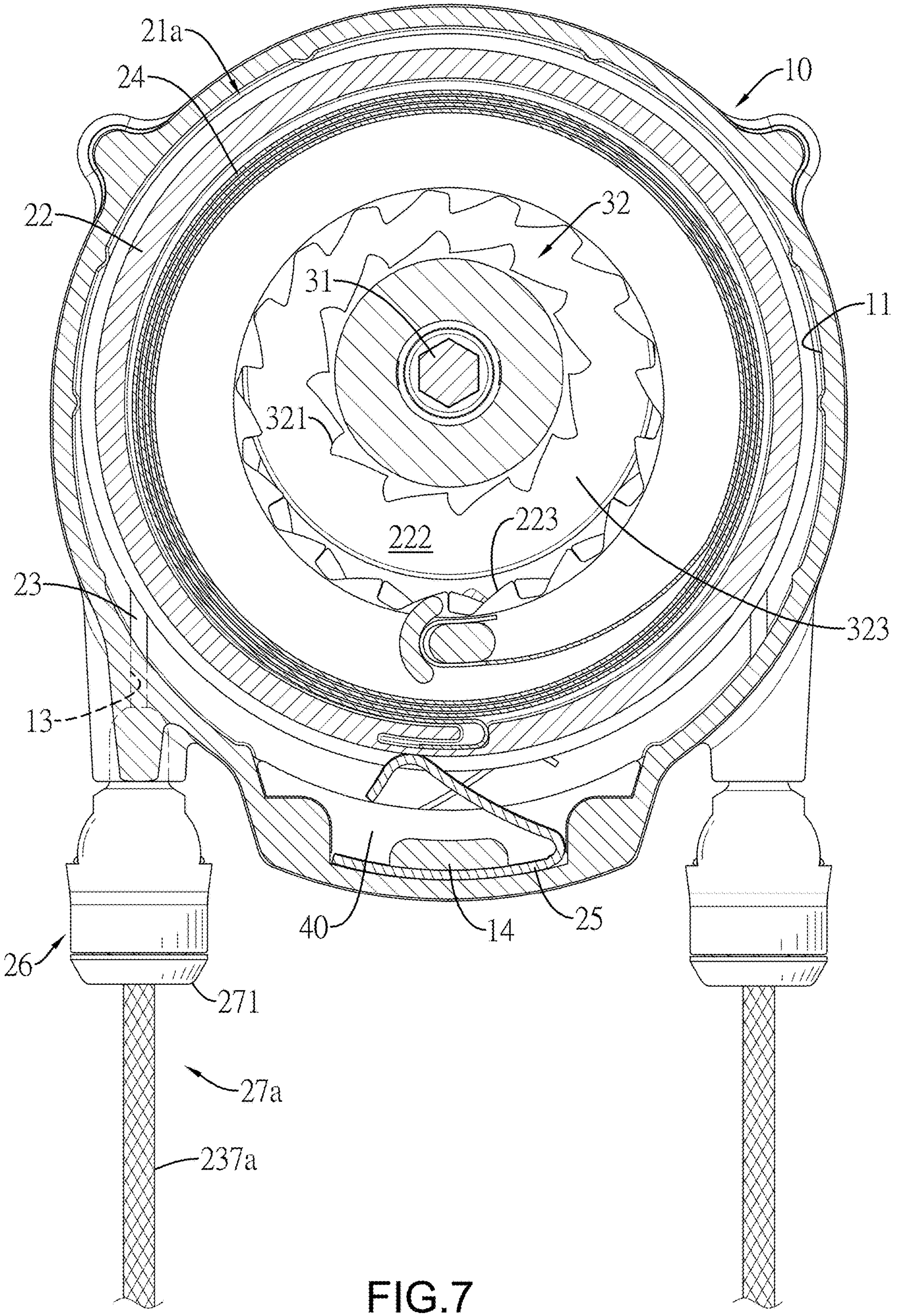
FIG. 7 is another front sectional view of the dual-spring dual-rope roller blind controller.
Figure 8:
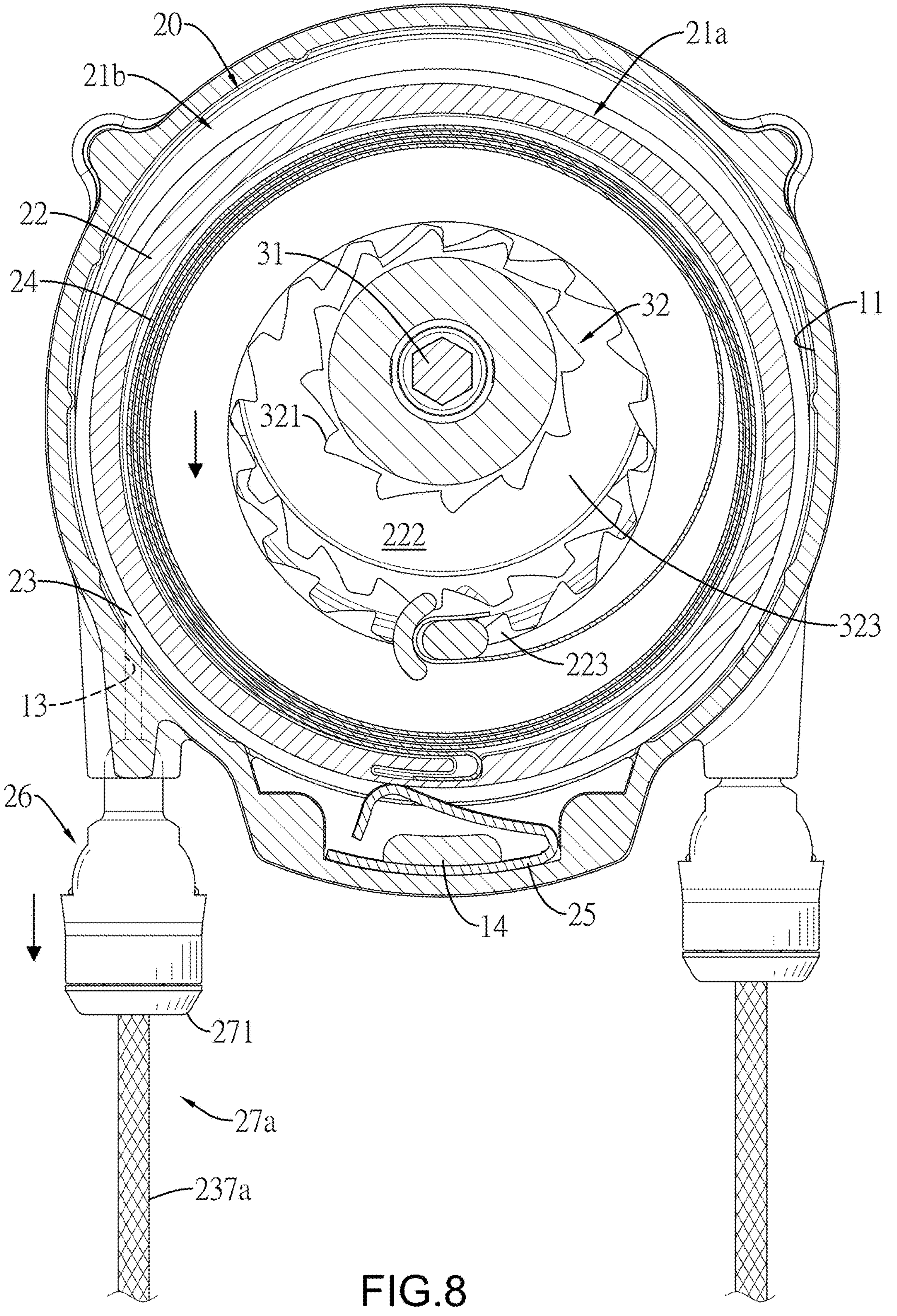
FIG. 8 is a first operating view of the dual-spring dual-rope roller blind controller, showing a rope being pulled.
Figure 9:
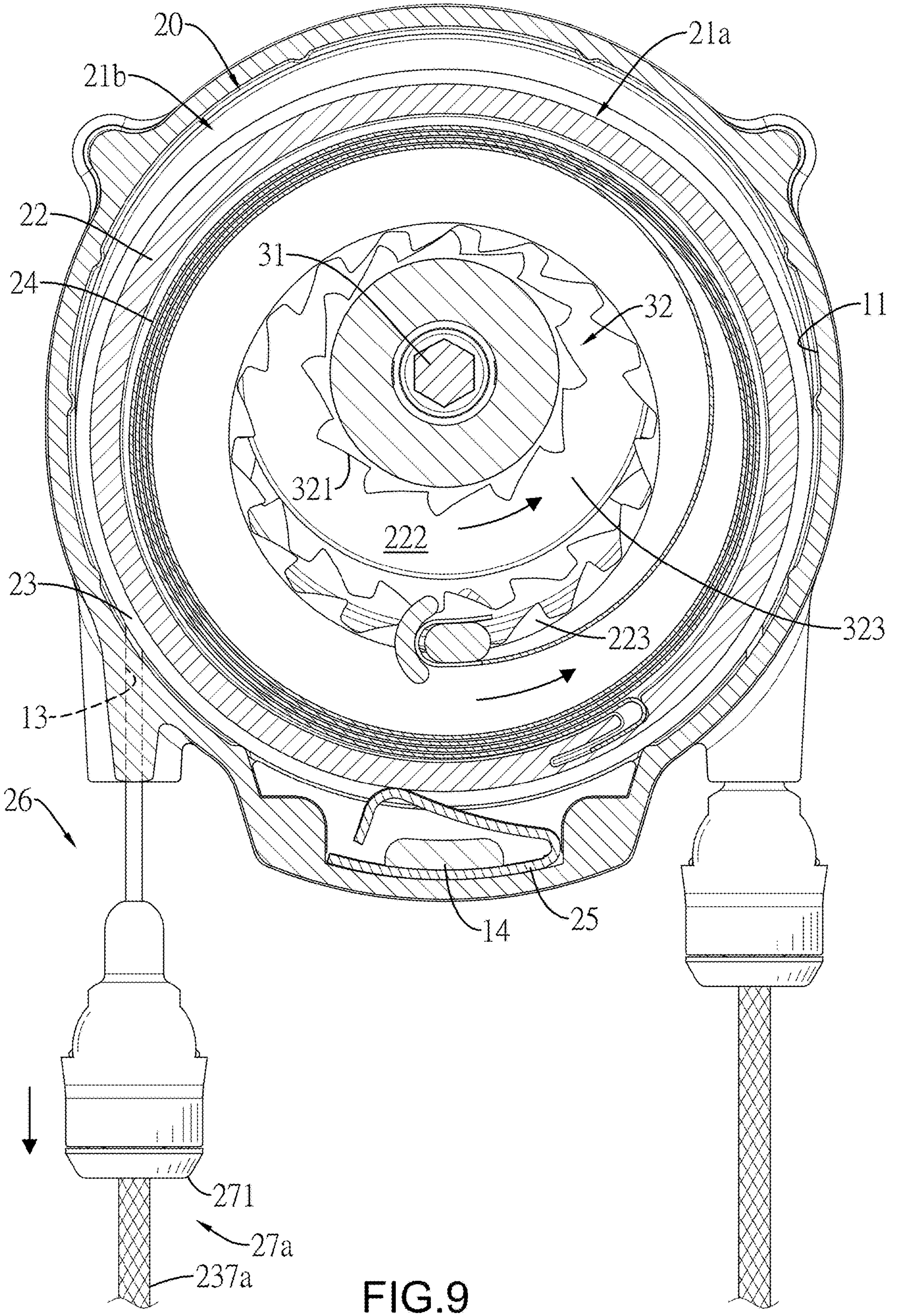
FIG. 9 is a second operating view of the dual-spring dual-rope roller blind controller, showing the rope being pulled.

As shown in FIGS. 7 and 8, when operating the dual-spring dual-rope roller blind controller and pulling the extending part 27*a*, 27*b* of the first roll-and-collect assembly 21*a*, the extending part 27*a*, 27*b* drives the rope 23 of the first roll-and-collect assembly 21*a*, so the corresponding collecting disc 22 will be driven by the rope 23 to be moved downwardly, and the resilient abutting element 25 is compressed. At this time, the ratchet toothed portion 223 of the collecting disc 22 engages with the corresponding wheel ratchet portion 321 of the driving wheel 32. As shown in FIGS. 8 and 9, when the extending part 27*a*, 27*b* keeps being pulled, the rope 23 drives the collecting disc 22 to rotate counterclockwise and the corresponding resilient roll-and-collect element 24 is rolled up. Simultaneously, the driving wheel 32 is rotated because the wheel ratchet portion 321 and the ratchet toothed portion 223 of the collecting disc 22 are engaged, therefore, the driving wheel 32 can drive the rotating shaft of the roller blind to rotate counterclockwise.

When releasing the extending part 27*a*, 27*b* of the first roll-and-collect assembly 21*a*, the collecting disc 22 of the first roll-and-collect assembly 21*a* will be pushed by the resilient abutting element 25 and back to its original position. Therefore, the ratchet toothed portion 223 of the collecting disc 22 is detached from the corresponding wheel ratchet portion 321 of the driving wheel 32, simultaneously, because the resilient roll-and-collect element 24 is released, the collecting disc 22 is rotated backwardly and clockwise to roll up the corresponding rope 23. By pulling the extending part 27*a*, 27*b* of the first roll-and-collect assembly 21*a*, the driving wheel 32 will drive the rotating shaft of the roller blind to rotate counterclockwise. Alternatively, by pulling the extending part 27*a*, 27*b* of the second roll-and-collect assembly 21*b*, the driving wheel 32 will drive the rotating shaft of the roller blind to rotate clockwise.

Therefore, as shown in FIGS. 7 to 9, through structural design of the roll-and-collect module 20 of the dual-spring dual-rope roller blind controller, when pulling any one of the ropes 23 of the first and second roll-and-collect assemblies 21*a*, 21*b*, the corresponding collecting disc 22 engages with the driving wheel 32 to drive the rotating shaft of the roller blind to rotate. At the same time, the corresponding resilient abutting element 25 and the corresponding resilient roll-and-collect element 24 can drive the collecting disc 22 to rotate back to its original angle and position. Therefore, a user can pull the ropes 23 to control the roller blind to roll up or expand, and drooping lengths of the ropes 23 are shortened, avoiding the ropes 23 tangling and causing risk of injury or choking, and thereby enhancing using safety.

Besides, as shown in FIGS. 2 to 4, the first roll-and-collect assembly 21*a* and the second roll-and-collect assembly 21*b* are operated separately and each cooperate with the corresponding resilient roll-and-collect element 24 and the corresponding resilient abutting element 25 to be engaged with the driving wheel 32 as how a clutch works. So, the dual-spring dual-rope roller blind controller has simplified structures and hence is easier to be assembled. The first roll-and-collect assembly 21*a* and the second roll-and-collect assembly 21*b* are identical structurally, thereby significantly lowering costs of molding and increasing economic efficiency.

To sum up, in the dual-spring dual-rope roller blind controller, through the structural design of the roll-and-collect module 20, the roll-and-collect module 20 is engaged with the driving wheel 32 as how a clutch works. Therefore, the drooping lengths of the ropes 23 are shortened, avoiding the ropes 23 tangling, which causes risk of injury or choking, while at the same time simplifying overall structures and lowering the costs.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A dual-spring dual-rope roller blind controller configured to be mounted at a roller blind and connected to a rotating shaft of the roller blind;
 the dual-spring dual-rope roller blind controller comprising:
  a housing having
   an assembling chamber disposed inside the housing;
   a shaft hole disposed at a center of the housing and spatially communicating with the assembling chamber;
   two through holes respectively disposed at two sides of a bottom portion of the housing;

a roll-and-collect module comprising two roll-and-collect assemblies being identical in structure and disposed in the assembling chamber of the housing; each one of the roll-and-collect assemblies comprising a collecting disc rotatably mounted inside the assembling chamber of the housing, being moveable up and down, and having a collecting recess disposed at a periphery of the collecting disc;

a clutch opening disposed at a center of the collecting disc; and a ratchet toothed portion disposed at an inner surface of the clutch opening and surrounding the clutch opening;

a rope rolled up, disposed in the collecting recess of the collecting disc, and extending through one of the two through holes of the housing;

a resilient roll-and-collect element connected between the collecting disc and the housing, and driving the collecting disc to rotate back to the collecting disc's original angle;

a resilient abutting element mounted at a bottom portion of the assembling chamber and abutting the collecting disc to push the collecting disc back to the collecting disc's original position;

the two roll-and-collect assemblies arranged opposite each other to make the two ropes of the two roll-and-collect assemblies rolled up in opposite directions;

a driving shaft comprising a shaft rod mounted through the shaft hole of the housing;

a driving wheel rotatably mounted around the shaft rod and passing through the two clutch openings of the two collecting discs of the two second roll-and-collect assemblies; the driving wheel comprising two wheel ratchet portions having different rotatable directions and respectively corresponding in position to the two ratchet toothed portions of the two collecting discs of the two roll-and-collect assemblies; each one of the two wheel ratchet portions engaged with or detached from the corresponding ratchet toothed portion;

a connecting portion configured to be connected to the rotating shaft of the roller blind; and a positioning disc extending radially and outwardly from between the two wheel ratchet portions and located between the two roll-and-collect assemblies.

2. The dual-spring dual-rope roller blind controller as claimed in claim 1, wherein each one of the two roll-and-collect assemblies comprises a buckling element mounted at a terminal end of the rope; and an extending part detachably buckled with the buckling element.

3. The dual-spring dual-rope roller blind controller as claimed in claim 2, wherein the buckling element comprises a buckling recess having a buckling opening faced downwardly;

multiple buckling holes spatially communicating with the buckling recess;

the extending part comprises a connecting buckle comprising multiple buckle hooks extending into the buckling recess of the buckling element and respectively buckled with the multiple buckling holes; and an extending unit connected to the connecting buckle.

4. The dual-spring dual-rope roller blind controller as claimed in claim 3, wherein the extending unit is a bendable rope.

5. The dual-spring dual-rope roller blind controller as claimed in claim 3, wherein the extending unit is an elongated rod.

6. The dual-spring dual-rope roller blind controller as claimed in claim 1, wherein the housing has two clamping protrusions protruding and disposed in the assembling chamber, and respectively clamping and fixing the two resilient abutting elements of the two roll-and-collect assemblies.

7. The dual-spring dual-rope roller blind controller as claimed in claim 2, wherein the housing has two clamping protrusions protruding and disposed in the assembling chamber, and respectively clamping and fixing the two resilient abutting elements of the two roll-and-collect assemblies.

8. The dual-spring dual-rope roller blind controller as claimed in claim 3, wherein the housing has two clamping protrusions protruding and disposed in the assembling chamber, and respectively clamping and fixing the two resilient abutting elements of the two roll-and-collect assemblies.

9. The dual-spring dual-rope roller blind controller as claimed in claim 4, wherein the housing has two clamping protrusions protruding and disposed in the assembling chamber, and respectively clamping and fixing the two resilient abutting elements of the two roll-and-collect assemblies.

10. The dual-spring dual-rope roller blind controller as claimed in claim 5, wherein the housing has two clamping protrusions protruding and disposed in the assembling chamber, and respectively clamping and fixing the two resilient abutting elements of the two roll-and-collect assemblies.

11. The dual-spring dual-rope roller blind controller as claimed in claim 1, wherein the dual-spring dual-rope roller blind controller comprises a limiting element disposed inside the assembling chamber of the housing and between the two resilient abutting elements of the two roll-and-collect assemblies.

12. The dual-spring dual-rope roller blind controller as claimed in claim 2, wherein the dual-spring dual-rope roller blind controller comprises a limiting element disposed inside the assembling chamber of the housing and between the two resilient abutting elements of the two roll-and-collect assemblies.

13. The dual-spring dual-rope roller blind controller as claimed in claim 3, wherein the dual-spring dual-rope roller blind controller comprises a limiting element disposed inside the assembling chamber of the housing and between the two resilient abutting elements of the two roll-and-collect assemblies.

14. The dual-spring dual-rope roller blind controller as claimed in claim 4, wherein the dual-spring dual-rope roller blind controller comprises a limiting element disposed inside the assembling chamber of the housing and between the two resilient abutting elements of the two roll-and-collect assemblies.

15. The dual-spring dual-rope roller blind controller as claimed in claim 5, wherein the dual-spring dual-rope roller blind controller comprises a limiting element disposed inside the assembling chamber of the housing and between the two resilient abutting elements of the two roll-and-collect assemblies.

16. The dual-spring dual-rope roller blind controller as claimed in claim 6, wherein the dual-spring dual-rope roller blind controller comprises a limiting element disposed inside the assembling chamber of the housing and between the two resilient abutting elements of the two roll-and-collect assemblies.

17. The dual-spring dual-rope roller blind controller as claimed in claim 7, wherein the dual-spring dual-rope roller blind controller comprises a limiting element disposed inside the assembling chamber of the housing and between the two resilient abutting elements of the two roll-and-collect assemblies.

18. The dual-spring dual-rope roller blind controller as claimed in claim 8, wherein the dual-spring dual-rope roller blind controller comprises a limiting element disposed inside the assembling chamber of the housing and between the two resilient abutting elements of the two roll-and-collect assemblies.

19. The dual-spring dual-rope roller blind controller as claimed in claim 9, wherein the dual-spring dual-rope roller blind controller comprises a limiting element disposed inside the assembling chamber of the housing and between the two resilient abutting elements of the two roll-and-collect assemblies.

20. The dual-spring dual-rope roller blind controller as claimed in claim 10, wherein the dual-spring dual-rope roller blind controller comprises a limiting element disposed inside the assembling chamber of the housing and between the two resilient abutting elements of the two roll-and-collect assemblies.

* * * * *